INVENTORS
Robert C. Allen, Jr.
George C. Pearce
BY
Their Attorney

Feb. 4, 1958   R. C. ALLEN, JR., ET AL   2,821,903
DOMESTIC APPLIANCE

Filed May 4, 1955   3 Sheets-Sheet 2

INVENTORS
Robert C. Allen, Jr.
BY George C. Pearce

R C Candor
Their Attorney

Feb. 4, 1958  R. C. ALLEN, JR., ET AL  2,821,903
DOMESTIC APPLIANCE
Filed May 4, 1955  3 Sheets-Sheet 3

INVENTORS
Robert C. Allen, Jr.
BY George C. Pearce
Their Attorney

United States Patent Office 2,821,903
Patented Feb. 4, 1958

2,821,903

DOMESTIC APPLIANCE

Robert C. Allen, Jr., Trotwood, and George C. Pearce, Dayton, Ohio, assignors to General Motors Corporation, Detroit, Mich., a corporation of Delaware Application May 4, 1955, Serial No. 505,902

8 Claims. (Cl. 99—338)

This invention relates to a domestic appliance and more particularly to rotisseries which may be readily installed and partly removed from a domestic electric oven.

It is an object of this invention to provide a simple practical rotisserie for installation in a domestic oven in which the placing of the spit in proper connection with the rotisserie motor causes a proper connection of the motor and the rearrangement of the oven circuits for barbecuing.

This and other objects are obtained in the form shown in the drawings in which the rotisserie motor and switching connections are placed on the outside at the rear of the oven. A removable spit is supported upon bearings within the oven and makes a removable connection through the rear wall with the motor. In making this connection, the spit engages and moves the operating elements of a switch mechanism which connects the rotisserie motor in circuit and also disconnects the lower oven heating unit and changes the connections of the upper heating unit to provide greater wattage.

Further objects and advantages of the present invention will be apparent from the following description, reference being had to the accompanying drawings, wherein a preferred form of the present invention is clearly shown.

Figure 1:
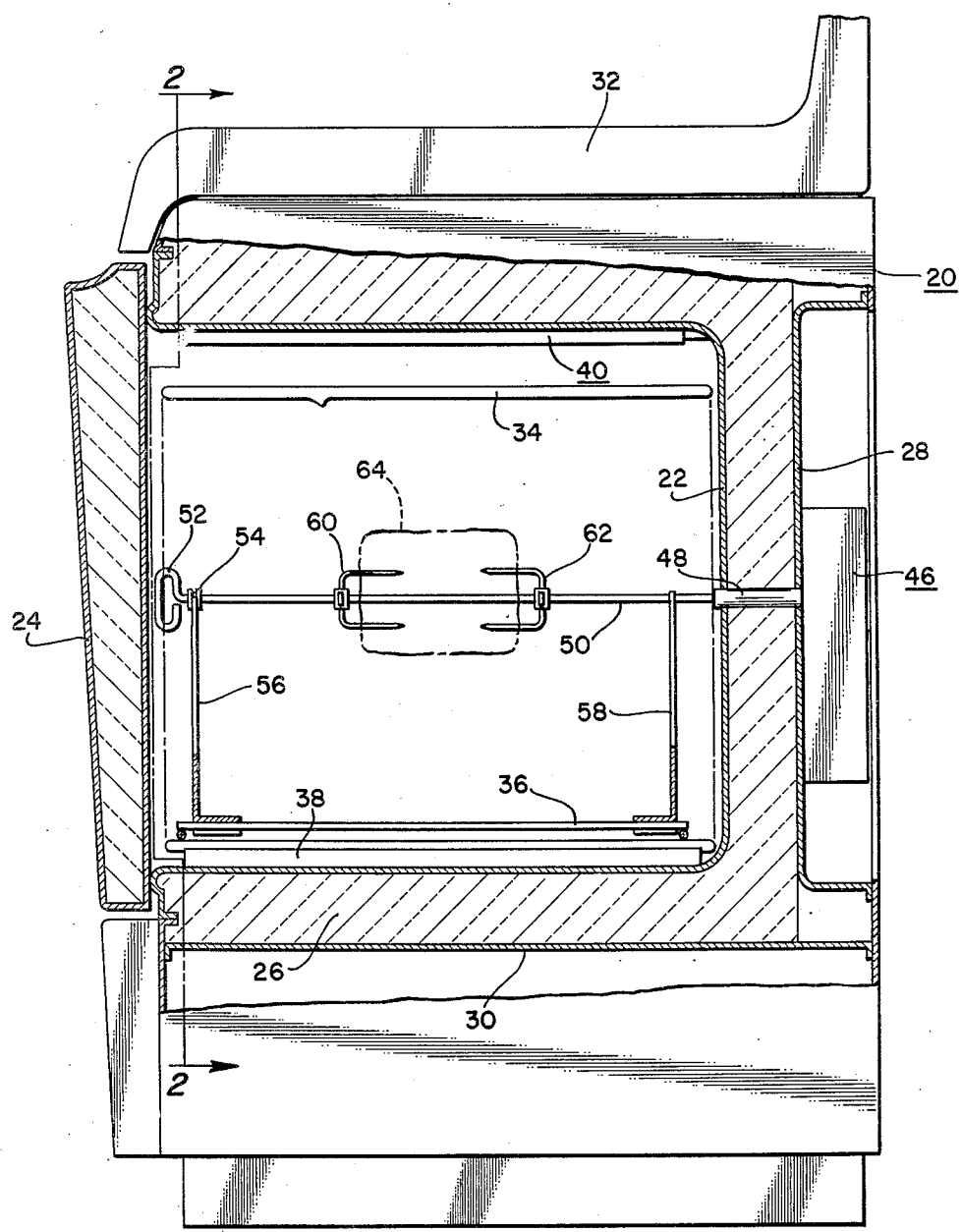
Figure 1 is a vertical sectional view through a domestic electric oven showing a rotisserie embodying one form of my invention.
Figure 2:
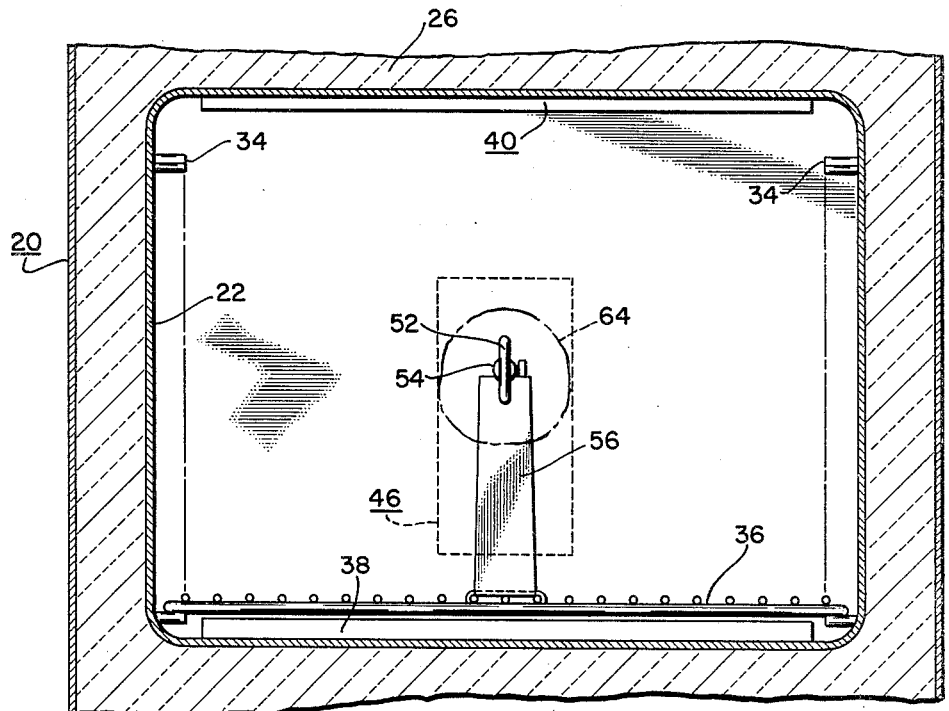
Figure 2 is a vertical sectional view taken along the lines 2—2 of Figure 1.
Figure 7:
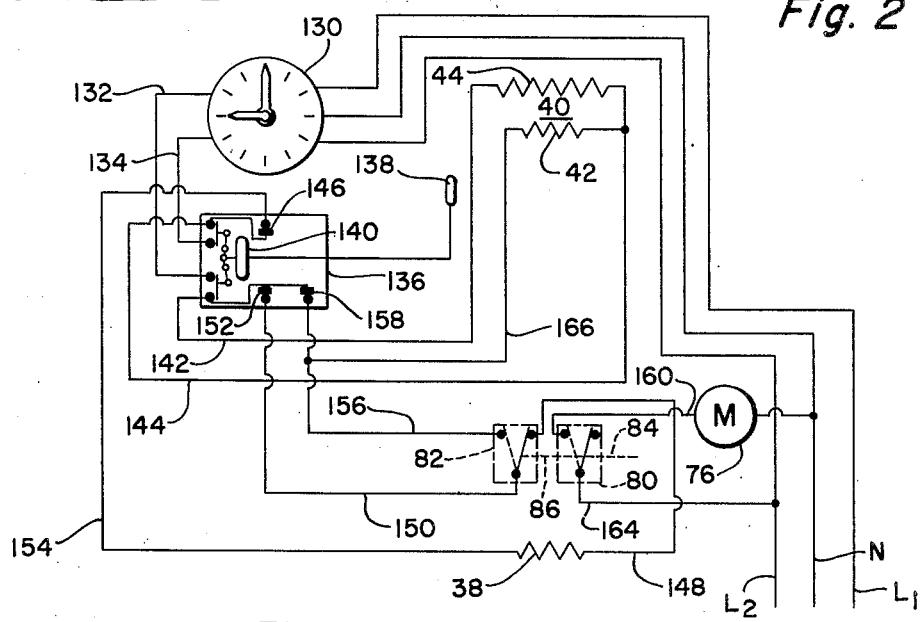
Figure 7 is a wiring diagram of the oven and rotisserie unit.

Referring now to the drawings and more particularly to Figures 1 and 2 there is shown a domestic range 20 including a box-shaped oven liner 22 closed by the front door 24 pivoted at its lower edge. The liner 22 is surrounded by heat isulation 26 held by a rear wall 28 and a bottom wall 30. The range is provided with a range top 32 above the oven. The side walls of the oven liner 22 are provided with a plurality of shelf supports 34 which are adjusted to support the shelves such as a shelf 36. The oven liner is provided with a lower oven heater 38 beneath the shelf 36 and has a two unit upper heater 40 having the sections 42 and 44 as shown in Figure 7.

For the purpose of installing a rotisserie in the oven, there is provided a motor unit 46 fastened to the rear wall 28 and provided with a coupling 48 extending forwardly through apertures in the rear wall 28 and the rear wall of the liner 22. This coupling also extends through the space in between containing the insulation 26. The coupling 48 connects to the spit 50 provided with the handle 52 and a grooved bearing 54 at the front end. The grooved bearing 54 is supported by the front bearing support 56 which is clamped onto the parallel bars of the shelf 36 as shown in Figure 2. The rear bearing support 58 clamps to the parallel bars 36 in a similar manner but merely has a notch providing a rear bearing support for the spit 50. The spit 50 is provided with a set of turning forks 60 and 62 clamped thereon by clamping screws for supporting the meat or other food 64 to be barbecued.

Figure 5:
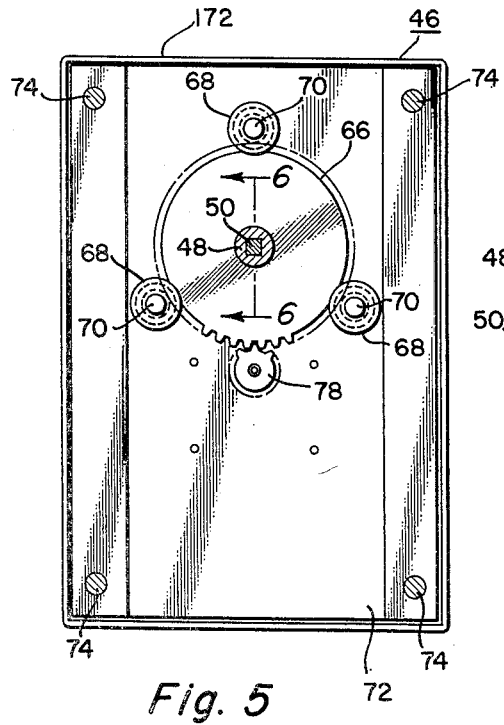
Figure 5 is a vertical sectional view taken along the line 5—5 of Figure 3.
Figure 6:
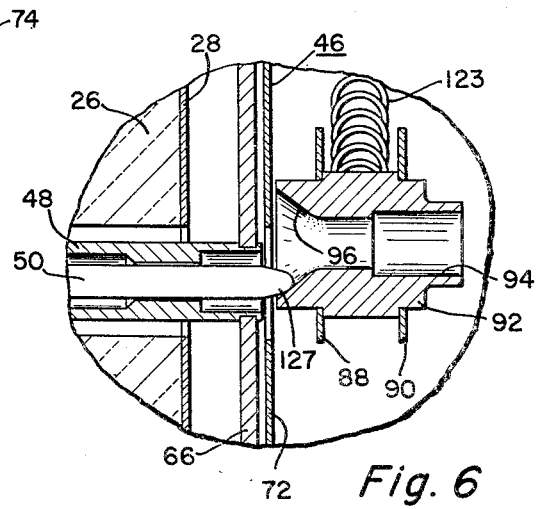
Figure 6 is an enlarged fragmentary sectional view taken along the line 6—6 of Figure 5.

The coupling 48 is provided with a coaxially located square aperture. This aperture receives the squared rear portion of the spit 50 as shown in Figures 5 and 6. The coupling 48 is riveted at its rear end to a large spur gear 66. This large spur gear 66 is supported by three flanged idler pinions 68 located symmetrically about the axis of the gear 66. The flanges of the idler pinions engage the sides of the large gear 66 while the teeth faces support the gear 66 in such a way that it is unnecessary for the coupling 48 to be supported by a bearing. The coupling 48 is therefore supported in a cantilever fashion by the gear 66. In effect therefore the bearing support for the coupling 48 and the gear 66 is provided by the bearings of the pinions 68. The pinions 68 are provided with bearings 70 which are riveted to a flanged channel-shaped frame 72. This frame 72 is fastened to the rear wall 28 of the oven by four screws 74.

Fastened to this frame member 72 is the rotisserie motor 76 having a drive pinion 78 meshing with the large gear 66. Also fastened to the frame 72 above the motor 76 are the rotisserie control switches 80 and 82. The switches 80 and 82 are provided with slide bar operating elements 84 and 86 which are biased downwardly into engagement with the plates 88 and 90. These plates 88 and 90 are held in spaced relation by a collar 92 having an aperture 94 therein provided with a chamfered or flared entrance 96. The plates 88 and 90 are also held in spaced relation by the spacing rivets 98. The plates 88 and 90 and the collar 92 are pulled upwardly in a clockwise direction about the pivot pin 121 by a tension spring 123 which connects at its lower end to the pivot 98 and at its upper end to an anchoring pin 125 riveted to the frame 72. The plates 88 and 90 have a notched upper edge which engages notches in the bottom surface of the operating elements 84 and 86 of the switches 80 and 82. The switches are normally biased to the position shown in Figure 7 by the tension spring 123.

Figure 4:
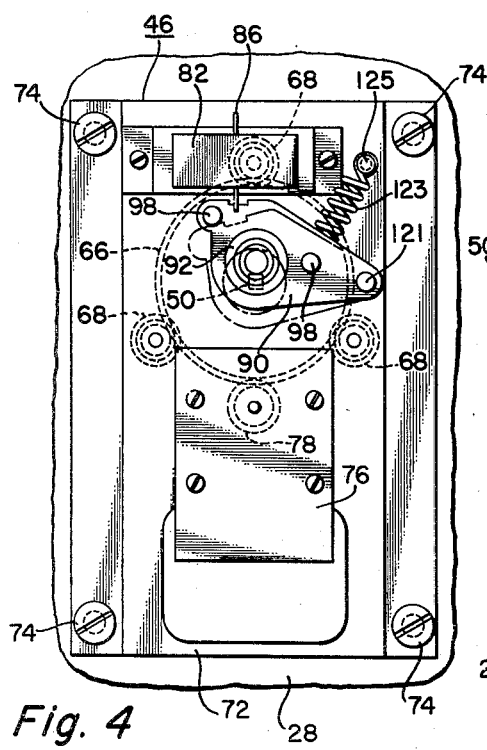
Figure 4 is a rear view of the motor and switch mechanism with the cover removed.
Figure 3:
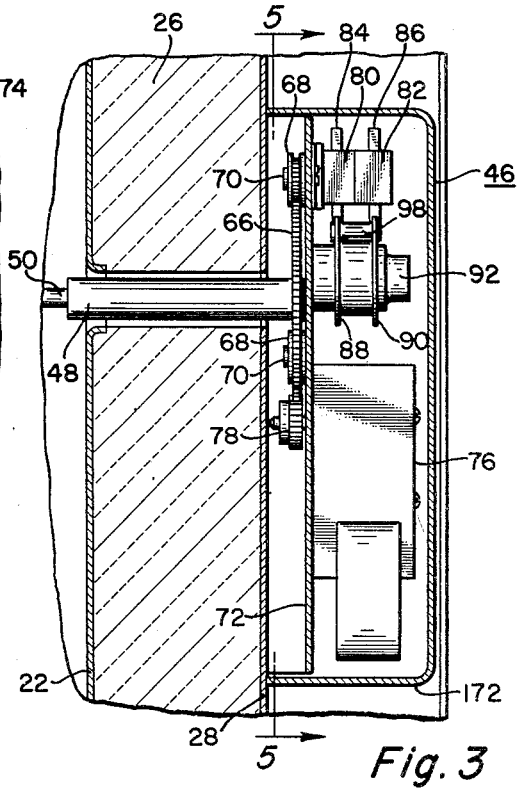
Figure 3 is an enlarged vertical sectional view through the driving unit including the rotisserie motor and the switch mechanism.

However the rear end of the spit 50 is provided with a tapered nose 127 which, when the spit is fully inserted through the coupling 48 and into the collar 92, will engage the flared or chamfered entrance 96 to cam the collar 92 downwardly into a position in coaxial alignment to the axis of the spit 50 and the coupling 48 as indicated in dot-dash lines in Figure 4. The camming of the coupling 92 downwardly causes the pates 88 and 90 to pivot about their pivot pin 121 as indicated in Figure 4. This allows the operating elements 84 and 86 of the switches 80 and 82 to move from the full line position shown in Figure 7 to the dotted line position.

Referring now more particularly to the wire diagram of Figure 7 the live supply conductors $L_1$ and $L_2$ as well as the neutral supply conductor N connect to a clock timer 130 which may be set to start and stop energization of the oven at different clock times. One example of such a timer may be found in the McCormick Patent No. 2,587,187 issued February 26, 1952. When the starting period is reached the clock timer 130 allows current to flow from the live conductors $L_1$ and $L_2$ to the conductors 132 and 134 connecting with the thermostat 136. The thermostat 136, which is shown only diagrammatically, includes a thermostat bulb 138 located within the oven liner 22. The bulb 138 connects to an operating diaphragm 140 which operates the bridging contacts, one of which connects the conductor 134 with the conductor 144 and the second of which connects the conductor 132 wtih the conductor 142.

The conductor 144 connects to one end of each of the heating sections 42 and 40 of the upper oven heater 40. The conductor 142 connects to the second end of the section 44. The thermostat 136 has contacts 146 which are closed in the bake position to connect the conductor 144 to a conductor 154 connecting with one end of the lower heating unit 38. The opposite end of the lower heating unit 38 is connected by the conductor 148 to one of the double throw terminals of the double throw switch 82. The common terminal of the double throw switch 82 is connected by the conductor 150 to a manually operable set of contacts 152 which are manually closed in the baking position of the thermostat 136 to connect to the conductor 142. The double throw switch 82 has a second double throw terminal connected by the conductor 156 to a set of manually operable contacts 158 in the thermostat 136, which when closed also connects to the conductor 142. One terminal of this rotisserie motor 76 is connected to the neutral supply conductor N while the second terminal is connected by the conductor 160 to the normally open switch terminal switch connection of the switch 80. The second terminal connection of the switch 80 is connected by the conductor 164 to the live supply conductor $L_2$.

As long as the spit 50 is not in coupling relationship with the coupling 48, the tension spring 123 will hold the plates 88 and 90 upwardly in the full line position as shown in Figure 4 to hold the switchs 80 and 82 in the full line position shown in Figure 7. To use the rotisserie, the clock 130 is set so as to connect the conductors 132 and 134 to the live supply conductors $L_1$ and $L_2$ at some preselected time. The thermostat 136 is turned to a baking circuit arrangement and set for some suitable barbecuing temperature, such as 400° F. Accordingly, since the oven interior is cold, the thermostat 136 will bridge the conductors 134 and 144 as well as the conductors 132 and 142. The adjustment of the thermostat 136 to the bake circuit position will also close the contacts 146 and 152. When the rotisserie is not used this provides a normal baking circuit providing 600 watts in the section 44 and 1800 watts in section 38.

After the meat 164 has been placed on the spit 50, the round nosed rear end of the spit 50 is pushed through the coupling 48 and through the collar 92 so that the collar 92 is cammed into a coaxial relationship with the spit 50 and the coupling 48. This moves the switches 80 and 82 from their full line position to the dotted line position as shown in Figure 7. In this position the switch 80 connects the rotisserie motor 76 across the supply conductor N and $L_2$. The switch 82 disconnects the conductor 148 and one terminal of the lower heating unit 38 from the supply conductor 132 and connects the conductor 150 with the conductor 156. As a result of this reconnection, the supply conductor 134 connects through the thermostat contacts to the conductor 144 which connects to one terminal of both the heater sections 42 and 44. The opposite ends of the heater sections 42 and 44 connect through intervening conductors and contacts to the supply conductor 132. Specifically the heater section 42 connects through the conductor 166, the conductor 156, the switch 82, the conductor 150, the contacts 152 and one bridging contact to the conductor 132. The heater section 44 also connects to the conductor 142 and is connected by the one bridging contact to the supply conductor 132. Both heater sections 42 and 44 are connected in parallel across the live supply conductors $L_1$ and $L_2$ to provide their maximum input of wattage.

This maximum input wattage will begin at the selected clock time and will continue until the temperature of the oven becomes high enough to cause the opening of the thermostatically controlled contacts of the thermostat 136. These contacts will then cycle to maintain a uniform temperature of the oven until the elapse of the selected time upon the clock timer 130. At this time, the clock timer 130 will disconnect the oven heaters from the supply conductors $L_1$ and $L_2$ to discontinue the heating operation. If desired, the time clock 130 may be omitted and the control accomplished entirely by the thermostat 136 and the actuation of the switches 82 and 80 by the coupling of the spit 50 in the proper position. The grooved bearing 54 and the closing of the door 24 will insure the movement of the spit 50 far enough to the rear through the coupling 48 to engage and move the collar 92 to a coaxial position. The squared rear end upon the shank of the spit 50 provides a satisfactory driving engagement between the spit 50 and the coupling 48. The energization of the motor 76 causes the pinion 78 to turn the gear 66 to rotate the coupling 48 and the spit 50 to turn the meat 64 at a proper speed for barbecuing.

The rotisserie unit may be conveniently sold as an accessory to be fastened to the rear wall 28 with the coupling 48 protruding through an aperture in the rear wall of the oven. It is provided with a suitable cover 172 in the mechanism at the rear. The spit and the bearing supports may be easily installed and removed at any time from the interior of the oven. The oven circuits when the thermostat 136 is set for baking are change automatically to a circuit arrangement suitable for barbecuing by the insertion of the spit through the coupling 48 to its proper operating position. This makes possible a simple and convenient arrangement.

While the form of embodiment of the invention as herein disclosed constitutes a preferred form, it is to be understood that other forms might be adopted, as may come within the scope of the claims which follow.

What is claimed is as follows:

1. An electric oven adapted to be connected to a power source including walls forming an oven compartment, an upper heater in said compartment, a rotisserie motor associated with said compartment, a lower heater in said compartment, a double throw switch means having a first position connecting said power source to said lower heater and a second position connecting said power source to said upper heater, a second switch means having a first position disconnecting said motor from said power source and a second position connecting said motor to said power source, coupling means for coupling said motor to a rotisserie spit, and means operated in response to the coupling of said coupling means and said spit for operating both of said switch means from said first position to said second position.

2. An electric oven adapted to be connected to a power supply including walls forming an oven compartment, an upper heater in said compartment, a rotisserie motor associated with said compartment, an electrical circuit connecting said motor and said supply, switch means connected in series with said circuit for connecting and disconnecting said motor to and from said power supply, a removable rotisserie spit having a sliding coupling arrangement with said motor, said switch means having an operating member extending to one end of said coupling adjacent the axis of said spit, said spit having an extension projecting through the coupling into engagement with said operating member for operating said switch means.

3. An electric oven adapted to be connected to a power supply including walls forming an oven compartment, an upper heater in said compartment, a rotisserie motor associated with said compartment, switch means for connecting said motor to said power supply, a removable rotisserie spit having a sliding coupling arrangement with said motor, said switch means having an operating member extending to one end of said coupling adjacent the axis of said spit, said spit having an extension projecting through the coupling into engagement with said operating member for operating said switch means, said extension and said member having a cooperating cam and follower arrangement for accomplishing this operation.

4. An electric oven adapted to be connected to a power supply including walls forming an oven compartment, an upper heater in said compartment, a rotisserie motor associated with said compartment, switch means for connecting said motor to said power supply, a removable rotisserie spit having a sliding coupling arrangement with said motor, said switch means having an operating member radially movable relative to the axis of said coupling and extending to one end of the coupling adjacent the axis of said spit, said spit having an extension projecting through the coupling and provided with a cam arrangement for moving said operating member from one portion to another.

5. An electric oven adapted to be connected to a power source including walls forming an oven compartment, a rotisserie motor associated with said compartment, electric heating means in said compartment comprising a lower heater and a second heater separated from the lower heater, a two position switch means having a first position connecting said power source to said lower heater and disconnecting said motor from said source, said switch means having a second position disconnecting said lower heater and connecting said power source to said second heater and said motor, coupling means for coupling said motor to a rotisserie spit, and means operated in response to the coupling of said coupling means and said spit for operating said switch means from the first position to the second position.

6. In combination with an electrically heated oven including walls forming an oven compartment, an electrical heating unit in said compartment, an electric motor secured to one wall of said compartment, a tubular coupling member open at both ends drivably connected with said electric motor, an electrical energizing circuit for said electric motor, a switch connected in series with said motor and said energizing circuit for controlling the energization of said motor, a switch actuator pivotally supported by said oven and located in alignment with said tubular coupling member, said switch actuator being formed with an aperture having an axis offset from the axis of said coupling member, said aperture having a chamfered entrance portion, and a rotisserie spit having an end portion fitting within said tubular coupling member and engaging in said aperture to pivot said switch actuator to a closed position when said spit is coupled to said tubular coupling member.

7. In combination with an electric range having an oven formed with a vertical front access opening, a door for said access opening, said oven having substantially vertically extending sidewalls, a substantially vertically extending rear wall, and a substantially horizontally extending bottom wall, a motor supporting wall spaced from said vertically extending rear wall and having marginal mounting flanges, insulating material between said rear wall and said motor supporting wall, aligned apertures in said rear wall, said insulating material, and said motor supporting wall, an electric motor supporting frame secured to said motor supporting wall between said mounting flanges, a pinion gear, an electric motor attached to said frame and having an armature drivably connected with said pinion gear, a tubular coupling member rotatably mounted so as to project through the said aperture in said motor support wall, a second gear meshing with said pinion gear and driving said tubular coupling member, at least one horizontally extending shelf guide on each sidewall of said oven and spaced a predetermined distance above the bottom wall of said oven, a combined drip pan and rotisserie spit supporting member extending between said shelf guides and resting on said shelf guides for slidable movement relative thereto, said supporting member including drip pan supporting means and having front and rear spaced upstanding spit supporting members extending above the drip pan supporting means and each having an open topped spit supporting groove located in alignment with one another and at substantially the same distance above the drip pan supporting means, a rotisserie spit having a bearing member fitting within the grooved top of said front spit supporting member and having an end portion for detachable connection with said tubular coupling member, electric heating means in said oven, electric power supply means adjacent the upper portion of said oven for supplying electric power to said heating means, electric power supply means adjacent the lower portion of said oven for supplying electrical power to said heating means, thermostatic switch means responsive to temperatures within said oven for controlling the energization of said electric heating means, and switch means controlling the energization of said electric motor.

8. In combination with an electric range having an oven formed with a vertical front access opening, a door for said access opening, said oven having substantially vertically extending sidewalls, a substantially vertically extending rear wall, and a substantially horizontally extending bottom wall, a motor supporting wall spaced from said vertically extending rear wall and having marginal mounting flanges, aligned apertures in said rear wall and motor supporting wall, an electric motor supporting frame secured to said motor supporting wall between said mounting flanges, a pinion gear, an electric motor attached to said frame having an armature drivably connected with said pinion gear, a tubular coupling member rotatably mounted so as to project through the said aperture in said motor supporting wall, a second gear meshing with said pinion gear and driving said tubular coupling member, at least one horizontally extending shelf guide on each sidewall of said oven and spaced a predetermined distance above the bottom wall of said oven, a combined drip pan and rotisserie spit supporting member extending between said shelf guides and resting on said shelf guides for slidable movement relative thereto, said supporting member including drip pan supporting means and having front and rear spaced upstanding spit supporting members extending above the drip pan supporting means and each having an open topped spit supporting groove located in alignment with one another and at substantially the same distance above the drip pan supporting means, a rotisserie spit having a bearing member fitting within the grooved top of said front spit supporting member and having an end portion for detachable connection with said tubular coupling member, electric heating means in said oven, thermostatic switch means responsive to temperatures within said oven for controlling the energization of said electric heating means, and switch means controlling the energization of said electric motor.

References Cited in the file of this patent

UNITED STATES PATENTS

| | | |
|---|---|---|
| 1,708,522 | Pross | Apr. 9, 1929 |
| 1,981,010 | Torson | Nov. 20, 1934 |
| 2,245,220 | Nelson | June 10, 1941 |
| 2,348,545 | Kahn | May 9, 1944 |
| 2,455,034 | Zoegall | Nov. 30, 1948 |
| 2,532,569 | Poole et al. | Dec. 5, 1950 |
| 2,558,294 | Finizie | June 26, 1951 |
| 2,720,158 | Finizie | Oct. 11, 1955 |